Patented Aug. 24, 1943

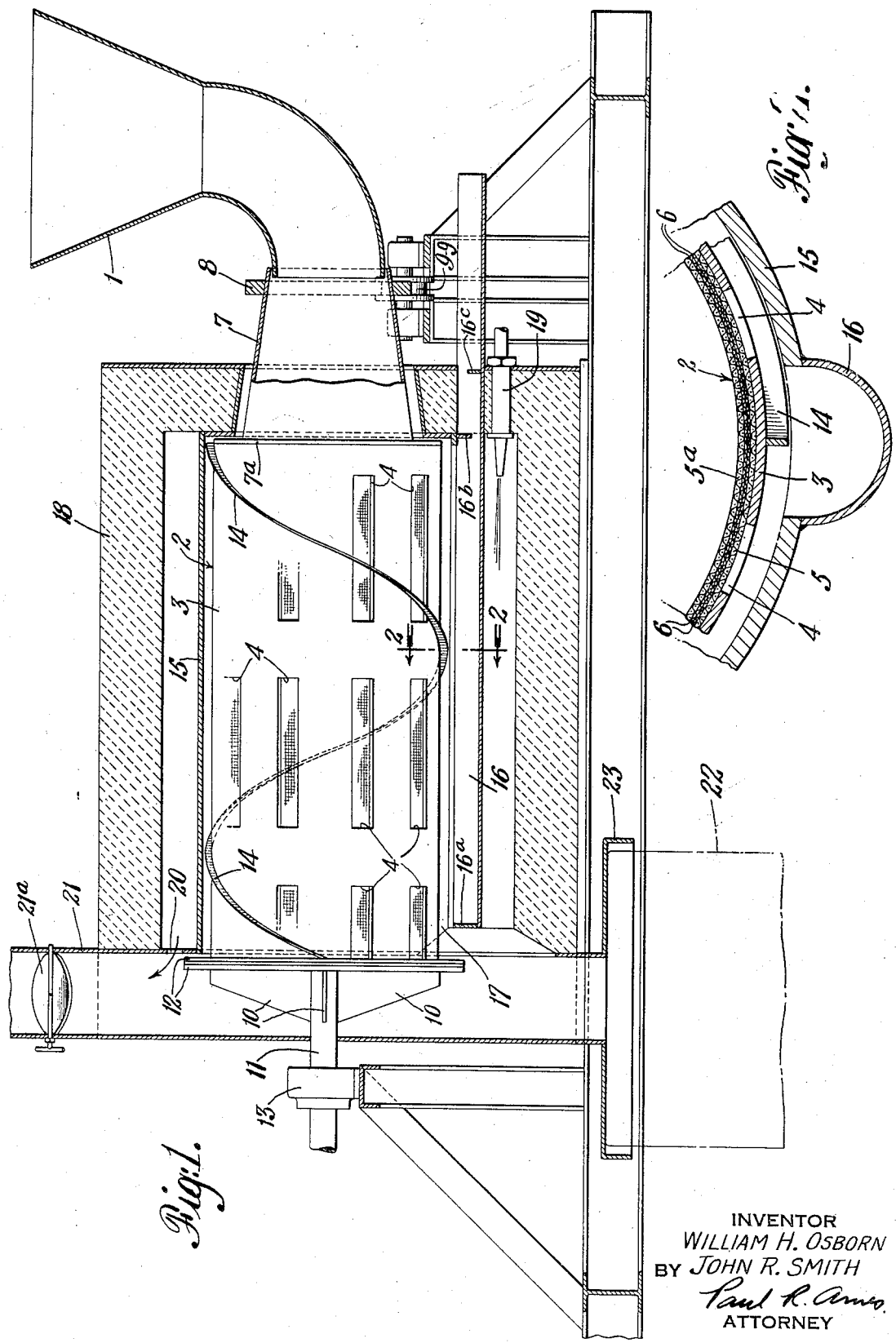

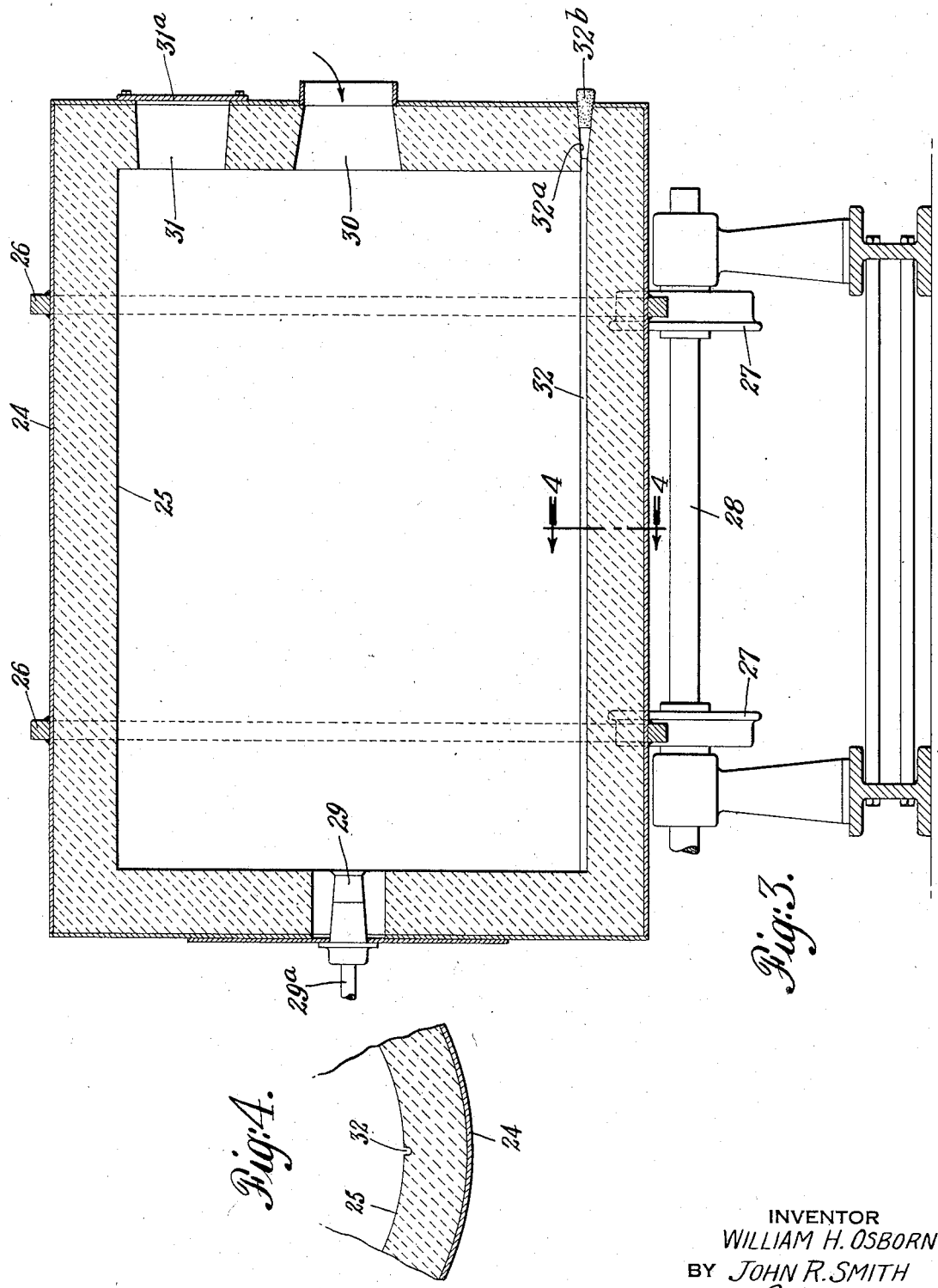

2,327,546

UNITED STATES PATENT OFFICE 2,327,546

RECOVERY OF ANTIMONY

William H. Osborn, New York, and John R. Smith, Flushing, N. Y., assignors to Phelps Dodge Corporation, New York, N. Y., a corporation of New York Application February 17, 1942, Serial No. 431,186

12 Claims. (Cl. 75—69)

This invention relates to the recovery of antimony and more particularly to the recovery of antimony from drosses, such, for example, as the aluminum-antimony and other drosses referred to in the Osborn Patent No. 2,278,134 or in the Osborn Patent No. 2,304,197, dated December 8, 1942. The present invention is especially concerned with an improvement in the procedure described in the former patent in which the grinding in oil or other inert vehicle may be omitted.

It is an object of the present invention to provide an improved procedure for the recovery of antimony. Another object is to provide an improved method for the disintegration of drosses or similar materials. It is also an object of the invention to provide a procedure for disintegrating drosses containing antimony and/or arsenic by which the particles of disintegrated material are put in such a condition that they can be stored with greater safety. It is a further object to provide a method for accurately controlling the roasting of the disintegrated dross. Other objects will become apparent.

As pointed out in the aforesaid Patent No. 2,278,134, there is considerable danger in the recovery of antimony and arsenic from drosses containing them, due to the possibility of the formation of the very poisonous gases stibine (antimony hydride, $SbH_3$) or arsine (arsenous hydride, $AsH_3$). In fact, aluminum-antimony drosses are among the most hazardous industrial materials to handle. The present invention is directed to an improved procedure for disintegrating such drosses at temperatures above those at which these gases will form. The dross is disintegrated by rotation in a tumbling screen at temperatures at which the poisonous gases, if formed, would dissociate, and preferably under conditions such as to partially oxidize the disintegrated particles. Such partially oxidized disintegrated particles may be stored with less danger than the original briquettes. For, if the original briquettes are stored, they generate lethal concentrations of arsine within the container in which they are stored; whereas the disintegrated powder from the present invention, although it still has to be treated with respect and care, is nevertheless much more inert and can be handled with much more safety. The invention also includes the further oxidation of the disintegrated particles in a roaster to volatilize the antimony as the trioxide.

In describing the invention, reference will be made to the drawings, in which Figure 1 is a vertical cross section on the center line of the disintegrator, certain portions being illustrated in elevation. Figure 2 is a fractional section on the line 2—2 of Figure 1. Figure 3 is a vertical section on the center line of the roaster and Figure 4 is a fractional sectional view on the line 4—4 of Figure 3.

The antimony dross, which may result from the refining of tin by the addition of aluminum or other drossing metals, as described in the aforesaid patents, may be separated from the mass of molten metal and charged, while still at temperatures above the decomposition temperatures of stibine and arsine, i. e., above 446° F., into the charging hopper 1 of the disintegrator shown in the drawings. It is preferred to remove at least some of the entrained molten metal from the dross before charging it to the disintegrator. This may be done, for example, by pressing the dross in a kettle press under pressures of about 125 to 225 pounds per square inch while maintaining it at a temperature above the melting point of the molten metal. If desired, the briquettes from the kettle press may be further pressed, before charging them to the hopper, at higher pressures than those ordinarily used in a kettle press, in order to separate a greater quantity of the entrained molten metal. One of the advantages of the present procedure, however, is that such higher pressure pressing is made unnecessary.

The material charged to the hopper 1 passes from the charge hopper directly into the rotating screen 2. This screen is made up of an outer metal cylinder 3 with rectangular or other shaped holes 4 cut in its peripheral surface to provide steel ribs running the length of the surface of the cylinder and with sufficient cross connecting circumferential ribs to give it the required strength. The cylinder in the apparatus illustrated may be made, for example, of a 16 inch iron pipe 36 inches long with the sections 4 cut out by burning to provide an open grid work, as illustrated in the drawings. If desired, the openings may be closer together than illustrated in order to provide a greater proportion of openings. Inside of this cylinder there is placed a cylinder of 4 mesh steel wire screen, as illustrated at 5, and inside of this screen there are placed two layers of 16 mesh steel wire screen, as illustrated at 6, and an inner layer of 4 mesh screen, as shown at 5a. The purpose of the 4 mesh screen is to give support and strength to the finer mesh screens and to protect it against the pounding effect of the briquettes.

The inlet end of the screen cylinder 3 is supported by means of a conical pipe or conduit 7 welded or otherwise fixed to a plate 7a, which in turn is welded or otherwise fastened to the end of the cylinder 3. This conical pipe is provided with a roller ring 8 adapted to bear and roll upon and within spaced flanged rollers 9, 9 supported in pairs of bearings on opposite sides of the center line of the screen. The other end of the screen cylinder 3 is supported by a plurality of fins 10 fixed to a shaft 11 and fastened to the screen cylinder 3 by means of the bolted or otherwise fastened flanges 12, 12. This end of the screen may be partly, or preferably entirely, closed by a plate held in position between the flanges 12, 12. The shaft 11 rotates in the bearing 13 and may be driven by any suitable means, such as a motor connected directly, or through pulleys or gears, to that shaft, to rotate the screen cylinder at the desired rate.

The entire screen cylinder 3 is positioned within a fixed steel cylinder 15 which, in the device illustrated, was made from a piece of steel pipe having an inside diameter of 18 inches. The lower portion of this cylinder 15 may be cut out and a trough 16 welded or otherwise fastened to it to provide a conduit for molten metal that may separate in this operation. This trough 16 extends beyond the furnace and may be slanted slightly so that the molten metal will flow to the right of the apparatus, as illustrated in Figure 1. The trough 16 is closed at 16a and is provided with a baffle 16b extending into it opposite the other end of the fixed cylinder, and an overflow dam 16c therebeyond, to form a metal trap and serve as a gas seal. If necessary, the portion of the trough outside of the furnace may be heated or insulated to keep the metal in it in a molten condition.

To the outer surface of the screen cylinder 3 there is attached a helical strip of steel 14, which, in the apparatus illustrated, is ⅝ inch wide by ⅛ inch thick. This strip is so arranged that upon rotation of the shaft 11 in a counter-clockwise direction as viewed from the left hand end of Figure 1, the disintegrated powder that has passed through the screen cylinder 3 into the annular space between that cylinder and the fixed cylinder 15 will be moved to the left and toward the discharge point 17.

The fixed cylinder 15 is surrounded by a wall or shell 18 of brick or other suitable refractory material to leave a combustion space surrounding the cylinder 15. Burners, as illustrated at 19, or other suitable means, may be provided for heating the space within the furnace 18 surrounding the cylinder 15. The combustion gases from this combustion space may pass through holes 20 in the end plate of the furnace and up through the flue 21. The disintegrated powder passes through the opening 17 into a barrel 22 which may be pressed against the fixed cover 23 so as to prevent infiltration of air. A damper 21a is provided in the flue 21 so that when closed the combustion gases will be forced back through the screen and discharge out through the charge hopper 1. By this means the air drawn in through the hopper may be reduced to any desired extent and the extent of oxidation and the resultant heating and oxidation of the material passing through the screen can be regulated. The whole apparatus may be mounted on a fixed frame, as illustrated. The capacity of the unit illustrated is approximately 1000 pounds per hour.

In using the apparatus for disintegrating antimony dross, the dross may be heated to temperatures of about 600 to 800° F. and the screen 3 may be rotated at approximately 60 revolutions per minute. In contacting and passing through the trundle screen 2, the briquettes from the kettle press are broken up into a fine powder. During this operation there is a partial oxidation of the material as shown by the fact that there is a gain of 15 to 17% in weight of the discharge over the charge to the apparatus. This increase in weight corresponds to an oxidation of about 60 to 65% of the metal present in the disintegrated particles. This partial oxidation has the effect of greatly reducing the danger of subsequent formation of arsine or stibine gases in the disintegrated product. By proper control of the damper in the flue 21, oxidation is limited so that only a portion of the tin metal entrained in the briquettes is oxidized. Any of the entrained metal that separates as a molten fraction will flow out through the conduit 16 and may be returned to the refining kettles. The powder from this disintegrator may be charged into the antimony roaster illustrated in Figures 3 and 4 or it may be stored and subsequently treated by that or some other procedure.

The roaster is a metal cylinder 24 lined with fire brick 25, or other suitable material, in the usual manner in cylindrical roasters. This roaster is provided with bearing rings 26, 26 adapted to roll on four flanged wheels 27, 27 positioned on shafts in bearings on opposite sides of the center line of the roaster. The wheels 27 may be fixed to the shaft 28, which may be rotated by any suitable means to rotate the roaster at the desired rate of speed. Preferably, the drive for the cylinder 24 is through only one of the four wheels 27, the other three wheels for supporting the cylinder being idling wheels which are self-aligning. For example, they may slide on the shafts 28 or they may be separately mounted.

A gas or other fuel burner 29 is provided at the closed end of the roaster, the flame of which burner can be regulated to any desired atmosphere by suitable combustion control apparatus. In order to accomplish this, the burner 29 is preferably cemented or otherwise fastened into the shell to seal the opening therein and a premixed air-gas mixture from an accurately controlled combustion controller is fed into the burner through a swivel jointed pipe 29a. Or, if preferred, the burner may be fixed to the pipe 29a and may be supported in a bearing in a flanged collar fixed to the shell to permit rotary motion of the shell. Obviously, other means may be provided for this purpose. The other end of the roaster is provided with an aperture 30 at its axis through which the disintegrated powder may be charged to the roaster. This end of the roaster is also provided with a discharge port 31, which is normally closed by a plate 31a that may be removed for hauling out or otherwise removing the finished calcine at the end of the run, the roaster being preferably stopped for this purpose so that the opening 31 is in the lower position. A conduit 32 and hole 32a, normally closed by a plug 32b, are provided for tapping out excess metal, as described hereinafter. During operation of the roaster, the aperture 30 is connected through a removable pipe (not shown) to a flue and bag system, wherein dust particles may be separated and reverted to the roaster and the fumes may be recovered. During charging, this pipe is removed and the charge is dumped through the aperture by a suitable charge hopper device.

In using this apparatus the charge, consisting of 3000 to 4000 pounds of disintegrated powder from the disintegrating operation hereinbefore described, is charged through aperture 30, after the apparatus has been brought up to a temperature of about 800° F., while the roaster is rotating, the rate of rotation being approximately 1½ R. P. M. If the charge follows the raking out of a previously finished calcine, the temperature of the roaster is generally still at least 800° F. and probably nearer or a little above 1000° F. Care should be observed not to have the furnace so hot as to cause the ingoing charge to "flash."

If sufficient excess tin is retained in the pressed-dross briquettes so that a little heat and agitation will cause it to separate out from the crystals of aluminum-antimonide (AlSb) with which it is mixed, molten tin may separate out in the roaster. Therefore, if molten metal separates from the disintegrated powder charged to the roaster, the rotation of the roaster is stopped as soon as the charging has been completed, or shortly thereafter, and the molten metal is tapped out through the metal tap 32a. If tapping of the metal is delayed too long or if the temperature of the roaster is too high, the tapped metal will contain excessive amounts of antimony. The end of the tap is determined by the cast appearance of the sample bar, it being possible to obtain an approximate idea of the antimony content of the metal by visual observation of such sample bars. The tapping is preferably stopped before the bars reach a percentage of antimony equal to that of the antimony in the bullion before addition of aluminum for antimony removal. For example, with bullions running 3 to 4% antimony, it is preferred to hold the tapped metal to about 1½% antimony.

As soon as the metal tap, if necessary, has been completed, air is admitted through the air port of the burner 29 in sufficient quantities to cause a further oxidizing of the charge and a gradual raising of the temperature of the charge to 1600 to 1750° F. In some cases the charge may not be sufficiently hot, when the air is first admitted through the burner, for the exothermic reaction of the oxidation of its metal content to get under way. In this case it may be necessary to introduce an oxidizing flame through the burner until a sufficiently high temperature to start the exothermic reaction has been obtained. This exothermic reaction will usually continue on air alone and build up the temperature of the charge when the charge has reached an initial temperature in the neighborhood of 1000 to 1200° F.

At first, more metal may separate out from the powder and the remaining powder float in the kiln on a metal bath. However, the oxidizing effect of the air stream gradually oxidizes all of the metal to a powder. During this period there is heavy fuming of antimony trioxide, which passes out through the aperture 30 and is caught in the bag house. As the oxidation of the charge approaches completion, the temperature will begin to fall off. At this point the flame is turned on and the feed of fuel and air are set to give a flame containing approximately 5% oxygen and the temperature is maintained at 1600 to 1700° F. until fuming has substantially ceased. The flame is then turned to reducing, i. e., so that it contains approximately 1% CO, until fuming has again ceased. This procedure is alternated two to four times until no more active fuming of the charge occurs. By this time the antimony will have been substantially all removed from the powder and the burner is shut off and the calcine remaining in the kiln is dragged out through the discharge port 31.

With a 3000 to 4000 pound charge in the roaster, a time cycle as follows was found satisfactory:

| | Approximate hours |
|---|---|
| Discharge calcine and charge in new disintegrated dross | 4 |
| Rotation and tapping of metal | 2 |
| Oxidizing with air only | 42 to 54 |
| Alternate oxidizing and reducing periods (4 hours each) | 24 |

The upper limit of temperature of this operation is that at which the product begins to ball up and sinter, which is approximately 1750° F. It varies considerably, however, with the amount of tin oxide in the charge. The higher the relative alumina content, the higher the temperature at which it can be roasted. In the same way, the oxidizing-reducing cycle can be varied considerably.

For example, a time cycle as follows has been found satisfactory:

| | Approximate hours |
|---|---|
| Period during which 100% air is admitted | 36 |
| First period of oxidizing flame (5% $O_2$) | 24 |
| First period of reducing flame (1% CO) | 8 |
| Final period of oxidizing flame (5% $O_2$) | 4 |
| Total time | Approximately 72 |

This time cycle may be varied almost directly in proportion to the amount of product charged. For example, a 1200 pound charge can be treated in 24 to 28 hours total time, whereas a 3600 pound charge takes approximately 72 hours.

With the roaster described, in which the burner is sealed into the roaster and a carefully regulated amount of air is introduced to give accurate control of combustion and atmosphere inside the roaster, the rate of oxidation of the trioxide may be controlled sufficiently accurately to give full antimony elimination on an exact setting of the burner, which will allow sufficient oxidation to oxidize the antimony to the trioxide and insufficient oxidation to permit its oxidation to the higher non-volatile oxides, such as pentoxide. Thus, if desired, the rate of oxidation may be controlled sufficiently accurately so that the formulation of trioxide may be completed without any alterations of atmosphere. For this purpose, however, it is necessary to provide substantially perfect combustion of the gases throughout the whole period.

By following the procedures described above, over 90% of the tin content of the disintegrated powder may be collected in the calcine from the kiln (which may be returned to the second reverberatory tin smelting furnace in the procedure as described in Patent 2,304,197) or in the tapped bullion (which may be returned directly to the refining kettles). The aluminum in the dross will remain in the calcine as an oxide and may be returned to the system with the calcine. Over 80% of the antimony may be recovered in the antimony fume collected in the bag house, the rest of the antimony being recycled with the bullion, the calcine, or the reverted dust. In good practice only about 1½% antimony is left in the bullion and about 1½% of antimony in the final calcine.

Arsenic contained in the dross acts similarly to the antimony and may be separated from it in the fume collected in the bag house.

It is obvious that many variations may be made in the above procedure, both in the method of operation and in the apparatus, and it is not intended to limit the invention to the particular details of procedure or of apparatus which are set forth as illustrative. For example, it may be desirable to eliminate the tumbling screens and to disintegrate the dross in the roaster. With such an operation the roaster may be initially rotated at higher speeds at a temperature of about 900° F. until the dross is disintegrated to the desired degree, after which the speed of rotation may be reduced and the controlled oxidation or alternate oxidations and reductions carried out as described above.

Particular reference has been made to the separation of antimony from aluminum-antimony drosses, although the invention may also be applied to the separation of antimony from other drosses or other materials of similar characteristics.

It is obvious that variations may be made in the temperatures, rates of rotation, times, etc. used in carrying out the various steps and other conditions may be preferred in various modifications of the process.

It is also obvious that many variations may be made in the construction of the apparatus and it is not intended to restrict it to the particular embodiment shown and described as illustrative. For example, the construction of the foraminous cylinder 2 may be varied and other means may be used for advancing the disintegrated material between the two cylinders. Other changes will also be obvious to those skilled in the art.

The terms used in describing the invention have been used in their descriptive sense and not as terms of limitation and it is intended that all equivalents of the terms used be included within the scope of the appended claims.

Apparatus for treating drosses that is disclosed but not claimed herein is claimed in the copending application of William H. Osborn, et al., Ser. No. 448,142, filed June 23, 1942.

We claim:

1. A method of disintegrating antimony dross containing at least one other metal, comprising tumbling the dry dross while maintaining it at a temperature above that at which poisonous gases of the metals present will form.

2. A method of disintegrating antimony dross containing a drossing metal, comprising tumbling the dry dross in a mildly oxidizing atmosphere to partially oxidize the material without fuming off substantial quantities of antimony trioxide while maintaining it at a temperature above that at which poisonous gases of the metals present will form.

3. A method of disintegrating antimony-aluminum dross, comprising rotating the dry dross in a foraminous container to partially oxidize it while maintaining it at a temperature of about 600 to 800° F.

4. A method of disintegrating antimony dross, comprising tumbling the dry dross in a mildly oxidizing atmosphere to partially oxidize it while maintaining it at a temperature of about 600 to 800° F.

5. A method of separating antimony from antimony drosses containing a drossing metal, comprising agitating the dry dross, while maintaining it at a temperature above that at which poisonous gases of the metals present will form, to disintegrate the dross, and subjecting the disintegrated material to controlled oxidation to fume off the antimony as antimony trioxide.

6. A method of separating antimony from antimony drosses containing a drossing metal, comprising agitating the dry dross in a mildly oxidizing atmosphere, while maintaining it at a temperature above that at which poisonous gases of the metals present will form, to disintegrate the dross without fuming off substantial quantities of antimony and subjecting the disintegrated material to controlled oxidation to fume off the antimony as antimony trioxide.

7. A method of separating antimony from antimony drosses containing a drossing metal, comprising agitating the dry dross, at temperatures above those at which poisonous gases of the metals present will form, to disintegrate the dross without fuming off the antimony and subjecting the disintegrated material to alternate oxidizing and reduction operations to fume off the antimony as antimony trioxide.

8. A method of separating antimony from antimony aluminum drosses, comprising agitating the dry dross, while maintaining it at a temperature of about 600 to 800° F., to disintegrate the dross, and subjecting the disintegrated material to controlled oxidation to fume off the antimony as antimony trioxide.

9. A method of separating antimony from antimony aluminum drosses, comprising agitating the dry dross in a mildly oxidizing atmosphere and while maintaining it at a temperature of about 600 to 800° F. to disintegrate the dross without fuming off the antimony, and subjecting the disintegrated material to controlled oxidation to fume off the antimony as antimony trioxide.

10. A method of separating antimony from antimony aluminum drosses, comprising agitating the dry dross in a mildly oxidizing atmosphere and while maintaining it at a temperature of about 600 to 800° F. to dissintegrate the dross without fuming off the antimony, and subjecting the disintegrated material to controlled oxidation at temperatures of 1000 to 1850° F. to fume off the antimony as antimony trioxide.

11. A method of separating antimony from antimony-aluminum drosses, comprising agitating the dry dross while maintaining it at a temperature of about 600 to 800° F. to disintegrate the dross, and subjecting the disintegrated material to alternate oxidizing and reducing operations to fume off the antimony as antimony trioxide.

12. A method of separating antimony from antimony drosses containing a drossing metal and entrained metal, comprising agitating the dry dross at temperatures above those at which poisonous gases of the metals present will form to disintegrate the dross, maintaining the disintegrated material at a temperature of about 600 to 800° F. and separating molten metal therefrom, maintaining the disintegrated material at about 1100 to 1200° F. in the presence of an oxidizing flame until the metal no longer forms a molten bath, increasing the temperature to about 1650 to 1850° F. in an oxidizing flame until fuming ceases, changing the flame to reducing and maintaining it reducing until the fuming ceases and resuming the oxidizing flame until the fuming again ceases, and collecting the fumes separated from the several operations.

WILLIAM H. OSBORN.
JOHN R. SMITH.